United States Patent
Yamada

(10) Patent No.: US 9,165,225 B2
(45) Date of Patent: Oct. 20, 2015

(54) PROGRAM AND INFORMATION PROCESSING APPARATUS

(71) Applicant: BROTHER KOGYO KABUSHIKI KAISHA, Nagoya-shi, Aichi-ken (JP)

(72) Inventor: Kazutaka Yamada, Nagakute (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/307,659

(22) Filed: Jun. 18, 2014

(65) Prior Publication Data

US 2014/0376011 A1    Dec. 25, 2014

(30) Foreign Application Priority Data

Jun. 19, 2013    (JP) ................ 2013-128631

(51) Int. Cl.
*H04N 1/40* (2006.01)
*G06K 15/02* (2006.01)
*G06F 3/12* (2006.01)

(52) U.S. Cl.
CPC .......... *G06K 15/1823* (2013.01); *G06F 3/1207* (2013.01); *G06F 3/1273* (2013.01); *G06F 3/1288* (2013.01)

(58) Field of Classification Search
CPC .......... H04N 1/00042; H04N 1/00962; H04N 1/0097; H04N 1/00973; H04N 1/2129; G06F 3/1203; G06F 3/1207
USPC .......... 358/1.13, 1.15–1.16, 1.9, 2.1, 468, 434
See application file for complete search history.

(56) References Cited

U.S. PATENT DOCUMENTS

| | | | | |
|---|---|---|---|---|
| 5,032,707 | A | * | 7/1991 | Gudmundson et al. ........ 235/375 |
| 5,872,638 | A | * | 2/1999 | Haze .............................. 358/405 |
| 2008/0144087 | A1 | * | 6/2008 | Mitsui ........................... 358/1.15 |
| 2008/0239346 | A1 | * | 10/2008 | Fujii et al. ...................... 358/1.9 |
| 2009/0109477 | A1 | | 4/2009 | Oomura et al. |

FOREIGN PATENT DOCUMENTS

| | | | |
|---|---|---|---|
| JP | 2006-303563 A | | 11/2006 |
| JP | 2009-110268 A | | 5/2009 |
| JP | 2010-137524 A | | 6/2010 |
| WO | WO 2007000621 A1 | * | 1/2007 |

* cited by examiner

*Primary Examiner* — Thomas D Lee
*Assistant Examiner* — Stephen M Brinich
(74) *Attorney, Agent, or Firm* — Scully, Scott, Murphy & Presser, P.C.

(57) ABSTRACT

There is provided a computer-readable medium having a computer program for causing a computer to perform operations including: acquiring a printing condition for print data to be printed by a printing apparatus; generating the print data based on the printing condition; determining, based on the printing condition, whether to generate a plurality of log data, each including an image corresponding to the print data; if it is determined to generate the plurality of log data for the print data, generating and storing in a storage device first log data which is log data according to the acquired printing condition, and second log data which is log data according to another printing condition different from the acquired printing condition; if it is determined not to generate the plurality of log data for the print data, generating and storing in the storage device only the first log data.

11 Claims, 6 Drawing Sheets

PROGRAM AND INFORMATION PROCESSING APPARATUS

CROSS-REFERENCE TO RELATED APPLICATION

This application claims priority from Japanese Patent Application No. 2013-128631, filed on Jun. 19, 2013, the entire subject matter of which is incorporated herein by reference.

BACKGROUND

There has been known technique in which when an information processing apparatus such as a personal computer (PC) transmits print data to a printing apparatus and causes the printing apparatus to performs printing based on the print data, the information processing apparatus generates information relating to the printing as log data, and stores a file including the log data in a storage device.

Also, there has been known a system including a printer (a printing apparatus), a host (an information processing apparatus) and a server. The host generates print data and log data corresponding to the print data. Then, the printer performs printing based on the print data, and the server manages the log data.

SUMMARY

However, the above technique has the following problem. That is, a printing condition might include, for example, changing to low density in a toner saving printing or the like, and reducing an image which is performed in an aggregate printing of aggregating a plurality of pages of images in one sheet or the like. If log data is generated while reflecting such printing condition, when confirming the content of the log data, visibility may deteriorate due to thinning of lines of figures, illegible lettering or the like.

Accordingly, an aspect of the present invention provides a program and an image processing apparatus which can make it easier to confirm the content of log data relating to printing.

According to an illustrative embodiment of the present invention, there is provided a non-transitory computer-readable medium having a computer program stored thereon and readable by a computer of an information processing apparatus, the computer program, when executed by the computer, causing the information processing apparatus to perform: acquiring a printing condition for print data to be printed by a printing apparatus; generating the print data based on the printing condition; outputting the generated print data to the printing apparatus; determining, based on the printing condition, whether to generate a plurality of log data, each including an image corresponding to the print data; if it is determined to generate the plurality of log data for the print data, generating and storing in a storage device first log data and second log data, the first log data being according to the acquired printing condition, the second log data being according to another printing condition different from the acquired printing condition; if it is determined not to generate the plurality of log data for the print data, generating and storing in the storage device only the first log data.

According to the above configuration, the information processing apparatus generates the print data, and the log data including an image corresponding to the print data based on the printing condition for the print data to be printed by the printing apparatus. Thereafter, the information processing apparatus stores the log data in the storage device, and transmits the print data to the printing apparatus. The storage device may be a memory built in the information processing apparatus, or may be any other device such as a server or an external storage. Further, when generating log data, the information processing apparatus determines whether to generate a plurality of log data based on the printing condition. If it is determined to generate a plurality of log data, the information processing apparatus generates first log data including an image according to the printing condition, and second log data including an image according to another printing condition which is a condition different from the printing condition. Examples of the another printing condition may include a condition having a visibility deteriorating condition (such as size reduction or low density) inactive in the printing condition, and a condition having a visibility enhancing condition (such as enlargement or highlighting) added to the printing condition. The number of second log data according to other printing conditions may be one or more.

That is, when generating log data including an image corresponding to print data, the information processing apparatus generates second log data according to a condition different from a printing condition if necessary, in addition to first log data generated according to the printing condition. Therefore, a possibility that log data including an image without no or smaller deterioration in visibility will be generated increases.

According to the above configuration, it is possible to implement a program and an image processing apparatus which can make it easier to confirm the content of log data relating to printing.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Hereinafter, an illustrative embodiment of the present invention will be described in detail with reference to the accompanying drawings. In the present illustrative embodiment, the inventive concept of the present invention is applied to a printing system including a printer, and a personal computer (PC) installed with a printer driver for the printer.

[Configuration of Printing System]

Figure 1:
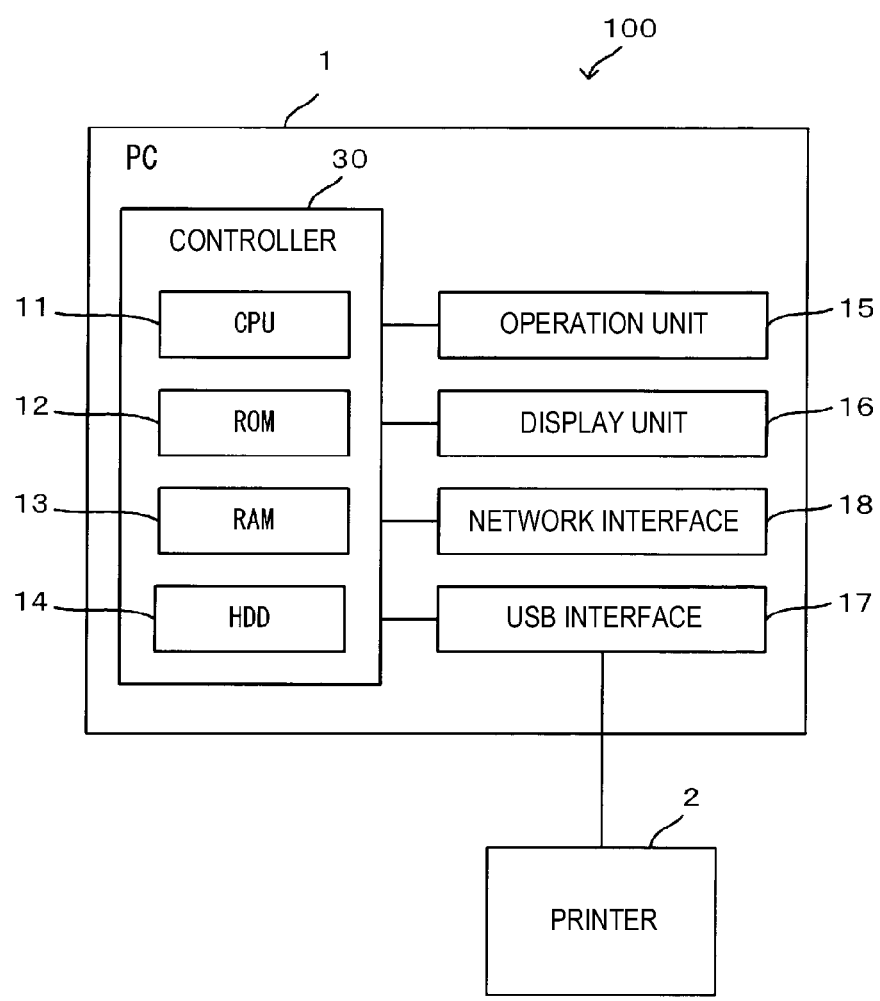
FIG. 1 is a block diagram showing a configuration of a printing system according to an illustrative embodiment.

As shown in FIG. 1, a printing system 100 according to the present illustrative embodiment includes a printer 2 (an example of a printing apparatus), and a PC 1 (an example of an information processing apparatus) for controlling the printer 2. In the printing system 100, the PC 1 and the printer 2 are connected through a USB cable.

Incidentally, the number of printers or PCs which configure the printing system 100 is not limited to one. That is, a plurality of printers or PCs may be connected. Also, a connection between the PC 1 and the printer 2 is not limited to a USB cable, but may be any other cable, such as a serial communication cable, a parallel communication cable, or a wired-LAN cable, or wireless communication such as a wireless LAN.

The PC 1 includes a controller 30. The controller 30 includes a CPU 11 which performs various processes, a ROM 12 which stores various programs, such as a program (BIOS) for an activating process to be performed by the CPU 11 during activation of the PC 1, a RAM 13 which is used as a temporal storage area when the CPU 11 performs various processes, and a hard disk drive (HDD) 14 (an example of a storage device) which stores various programs and data. Herein, the controller 30 in FIG. 1 is a collective term for hardware such as the CPU 11 which is used for controlling the printer, and is not limited to a single piece of hardware actually existing in the PC. The CPU 11 may be an example of a controller.

The PC 1 includes an operation unit 15 which includes a keyboard, a mouse, and the like, a display unit 16 which is configured by a liquid crystal display or the like, a USB interface 17, and a network interface 18. These components are controlled by the controller 30. The USB interface 17 is hardware for performing communication with an apparatus connected through a USB cable. The network interface 18 is hardware for performing communication with an apparatus connected through a LAN cable. The USB interface 17 and the network interface 18 may be an example of a communication unit.

The PC 1 stores therein an operating system (OS), application programs (such as word processing software, drawing software, spreadsheet software, and photograph data editing software), and a printer driver (an example of a program) for controlling the printer 2. Also, various programs may be read from storage media such as a CD-ROM and installed, or may be downloaded from a server on a network and installed.

The printer 2 may use a general image forming method such as an electrophotographic method or an inkjet method as long as the printer 2 has an image forming function on a sheet. The printer 2 may be able to form multi-color images and monochrome images, or may be able to form only monochrome images.

[Operation of PC]

Subsequently, an operation of the PC 1 when the printing system 100 of the present illustrative embodiment performs printing will be described with reference to the block diagram of FIG. 2. A graphic engine 51 and a spooler 52 of FIG. 2 are provided as parts of the OS.

Figure 2:
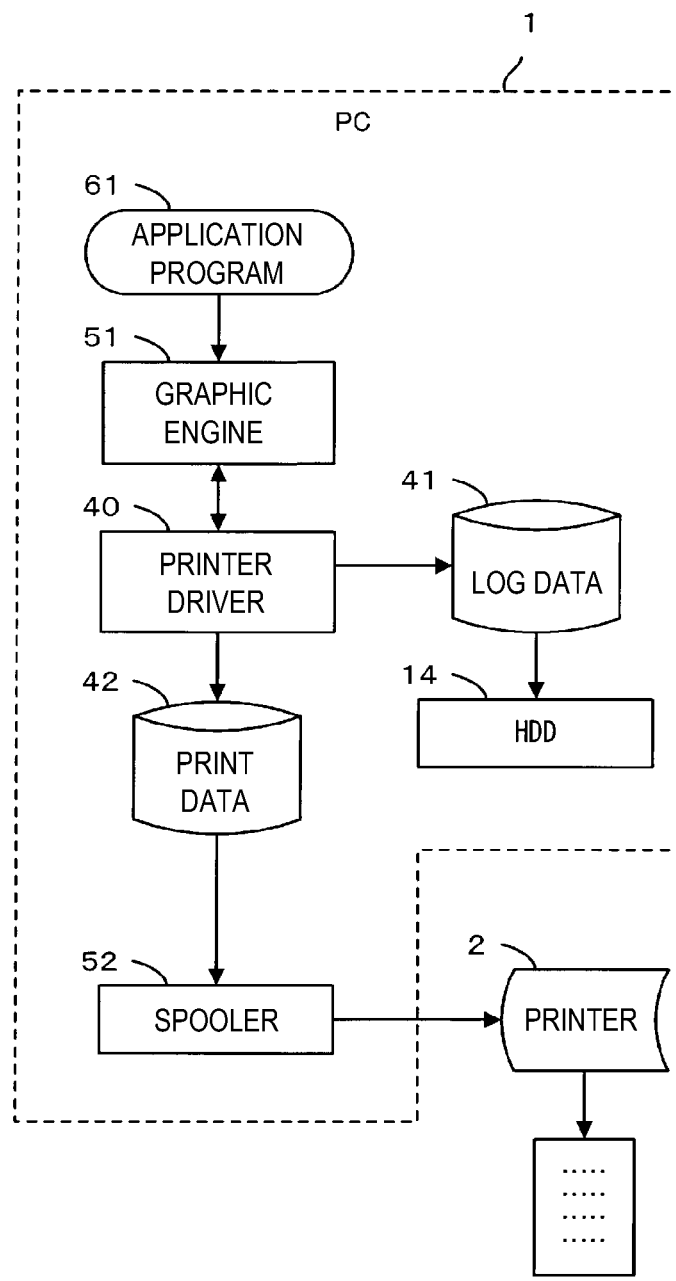
FIG. 2 is a block diagram showing a printing procedure in the printing system according to the illustrative embodiment.

A printer driver 40 of FIG. 2 performs processing of an image to be printed, and performs a process of generating print data 42 based on the processed image. Examples of the processing may include adding a watermark, a header, footer or the like, changing magnification such as enlargement or reduction, rotating of an image, and aggregating images such as 2in1 or 4in1.

The printer driver 40 has a log function of recording a log relating to printing. That is, at generation of print data 42, the printer driver 40 generates log data 41 which includes the print data 42. When a print instruction is received through an application program 61, the printer driver 40 generates print data 42 and the log data 41 based on a printing condition for print data 42 to be printed by a printing apparatus. Then, the printer driver 40 controls the PC 1 to transmit the print data 42 to the printer 2 and stores the log data 41 in a designated directory of the HDD 14.

The printer driver 40 can, in the log function, change a part of the printing condition and store an image different from a printing result, in addition to storing the same image as a printing result. Hereinafter, among log data 41 which the printer driver 40 generates, log data including an image according to the same printing condition as that for print data will be referred to as first log data, and log data including an image according to a different printing condition which is a printing condition different from that for print data will be referred to as second log data. The number of second log data may be one or more.

Figure 3:
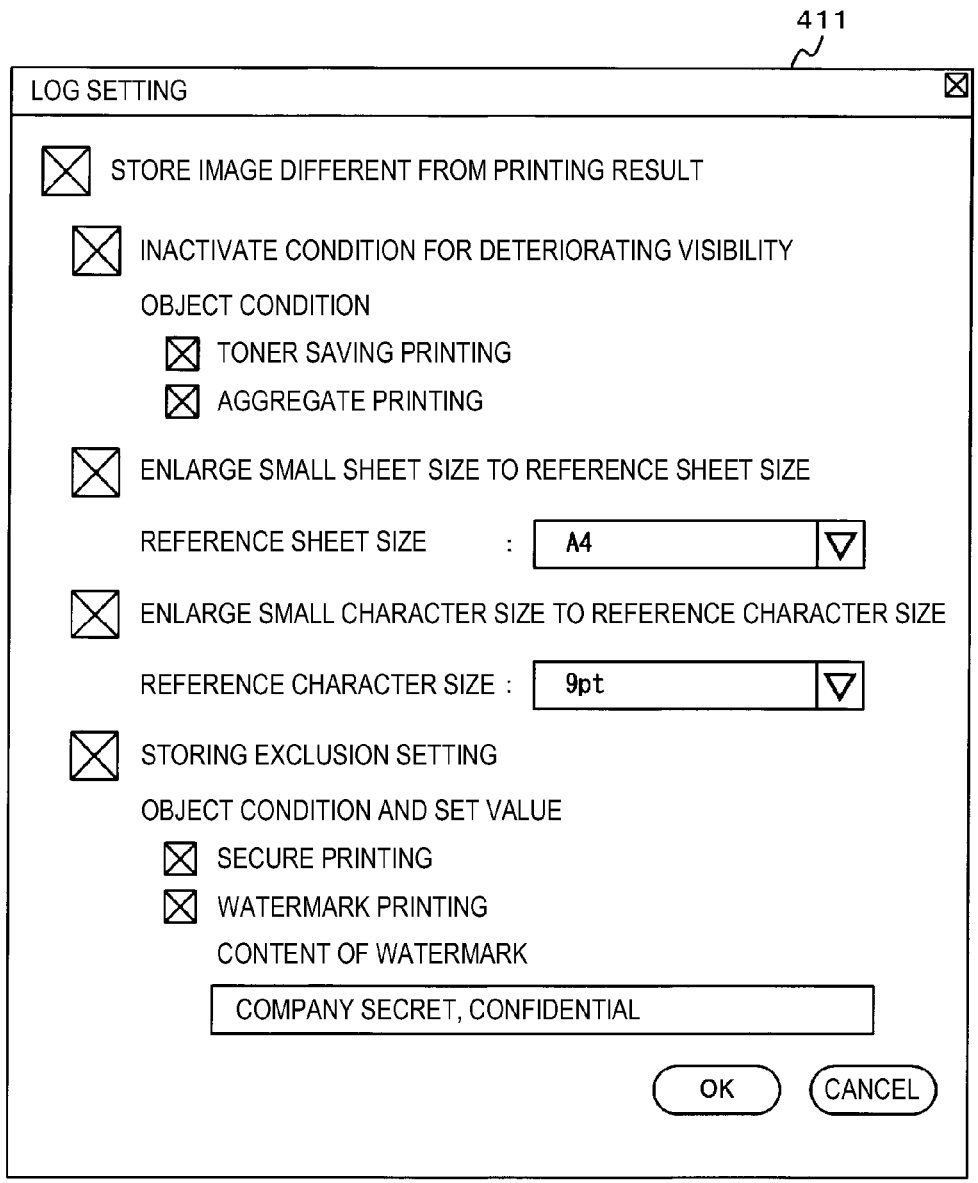
FIG. 3 is a view showing a configuration of a log setting screen.

The printer driver 40 provides a log setting screen 411 for allowing a user to input various setting relating to the log function, as shown in FIG. 3. If a check box for a setting "STORE IMAGE DIFFERENT FROM PRINTING RESULT" in the log setting screen 411 is ON, a function of generating second log data is activated, and if that check box is OFF, that function is inactivated. If that function is set inactive, first log data is generated, but no second log data is generated. If that function is set active, first log data and one or more second log data are generated.

Further, the log setting screen 411 includes items for determining a different printing condition for second log data, that is, a low-visibility inactivating setting for inactivating a condition which causes deterioration in visibility, a sheet enlargement setting for enlarging a print image into an image fit to a reference sheet size, and a character enlargement setting for enlarging characters included in a print image to a reference character size.

Specifically, if a check box for a setting "INACTIVATE CONDITION FOR DETERIORATING VISIBILITY" in the log setting screen 411 is ON, the low-visibility inactivating setting is activated, and if that check box is OFF, that setting is inactivated. Further, in the low-visibility inactivating setting, from printing conditions for deteriorating visibility (hereinafter, referred to as low-visibility conditions), a low-visibility condition can be selected as an inactive object. Examples of the low-visibility conditions may include a condition of reducing the number of dots or reducing a size of dots in an image with respect to a reference printing condition such as a default printing condition. In the present illustrative embodiment, as an object condition of the low-visibility condition, a toner saving printing and an aggregate printing can be selected. The low-visibility conditions may be examples of a specific condition. Incidentally, when the toner saving printing is set active, in order to save usage of toner, some dots are omitted from original image data, and therefore, the number of dots is reduced. Therefore, an image printed in the toner saving printing appears thinner, which would cause deterioration of visibility. Also, when the aggregate printing is set active, since images of a plurality of pages are printed in one sheet, the size of images needs to be reduced. In order to reduce the size of images, some dots are omitted from original image data or a size of dots in original image data is reduced, which would cause deterioration of visibility. In a case where the low-visibility inactivating setting is set active, if a low-visibility condition selected as an inactive object is set in the printing condition, the printer driver 40 uses a different printing condition in which the low-visibility condition is inactivated, to generate second log data.

Further, if a check box for a setting "ENLARGE SMALL SHEET SIZE TO REFERENCE SHEET SIZE" in the log setting screen 411 is ON, the sheet enlargement setting is activated, and if that check box is OFF, that setting is inactivated. Also, in the log setting screen 411, the reference sheet size can be changed according to selection of the user. An image printed on a small-sized sheet tends to have low visibility. For this reason, in a case where the sheet enlargement setting is set active, if a sheet size smaller than the reference sheet size is set in the printing condition, the printer driver 40 uses a different printing condition in which an enlargement factor for enlarging print an image to the reference sheet size is set, to generate second log data.

Further, if a check box for a setting "ENLARGE SMALL CHARACTER SIZE TO REFERENCE CHARACTER SIZE" in the log setting screen 411 is ON, the character enlargement setting is activated, and if that check box is OFF, that setting is inactivated. Also, in the log setting screen 411, the reference character size can be changed according to selection of the user. A small-sized character tends to have low visibility. For this reason, in a case where the character enlargement setting is set active, if a character size smaller than the reference character size is set in the printing condition, the printer driver 40 uses a different printing condition in which the character size is changed to the reference character size, to generate second log data.

Further, if a check box for a "STORING EXCLUSION SETTING" in the log setting screen 411 is ON, a storing exclusion setting is activated, and if that check box is OFF, the storing exclusion setting is inactivated. Specifically, in the storing exclusion setting, a secure printing in which password input is requested for performing printing and a watermark printing in which watermark printing of a specific character string is performed can be selected as object conditions for the storing exclusion setting. Those printing jobs tend to include critical information having a high degree of importance, and thus if a plurality of data including such critical information is generated, the possibility of information leakage increases. Especially, in a case of secure printing, if it is possible to easily access to log data, the effect of enhancing the confidentiality by requesting a password for printing weakens. For this reason, whether to generate a plurality of log data is determined according to selection of the user. That is, in a case where the storing exclusion setting is active, if a condition selected as a storing exclusion object is set in the printing condition, the printer driver 40 does not generate second log data.

Further, a watermark tends to have different degrees of importance according to the content of character strings, and thus as a storing exclusion object, a character string can be selected as "CONTENT OF WATERMARK". For this reason, although watermark printing is selected, if a character string to be a storing exclusion object is not included in the content of watermark, the print data does not become a storing exclusion object. If no character string is set in the "CONTENT OF WATERMARK", all character strings are set as storing exclusion objects.

Referring to FIG. 2, the graphic engine 51 is a module for controlling output devices such as the printer 2 and the display unit 16. The graphic engine 51 receives a command from the application program 61, and transmits the command to a device driver (the printer driver 40 in the present illustrative embodiment).

The spooler 52 is a module having a function of temporarily accumulating the print data 42 generated by the printer driver 40 and sequentially outputting the print data 42 to the printer 2. That is, in this specification, an expression "the printer driver 40 transmits the print data 42 to the printer 2" means that the printer driver 40 accumulates the print data 42 in the spooler 52, and does not means that the print data 42 is actually transmitted to the printer 2 by the spooler 52.

When the printing system 100 of the present illustrative embodiment performs printing, first, the application program 61 installed in the PC 1 receives a print instruction from the user, and outputs a printing start notification. Then, the graphic engine 51 which is a part of the OS receives the printing start notification from the application program 61, and starts to acquire image data as a print target from the application program 61.

When acquiring of image data starts, the graphic engine 51 transmits a drawing command to the printer driver 40. When receiving the drawing command, the printer driver 40 generates a bitmap image (BMP image) based on the drawing command, and generates print data 42 in a PDL format based on the BMP image. Also, during generating of the print data 42, the printer driver 40 performs processing such as image inversion if necessary. Also, the printer driver 40 generates log data 41 based on the BMP image. The file format of the log data 41 may be any format which the user can browse, and for example, BMP, XML, and JPEG can be applied. The log data 41 may includes not only first log data but also second log data which is generated according to a log setting set by the log setting screen 411.

After generating of the print data 42, the printer driver 40 stores the print data 42 in the spooler 52. When the print data 42 is stored in the spooler 52, the spooler 52 transmits the stored print data 42 to the printer 2. When receiving the print data 42, the printer 2 performs printing based on the print data 42.

Also, when generating log data 41 of one page, the printer driver 40 temporarily stores the log data 41 in a predetermined folder of the HDD 14. Further, after transmitting print data of all pages, the printer driver 40 integrates the log data 41 of all pages thereby generating one PDF file for each printing condition. This PDF file is stored in a designated folder of the HDD 14.

[Printing Process]

Figure 4:
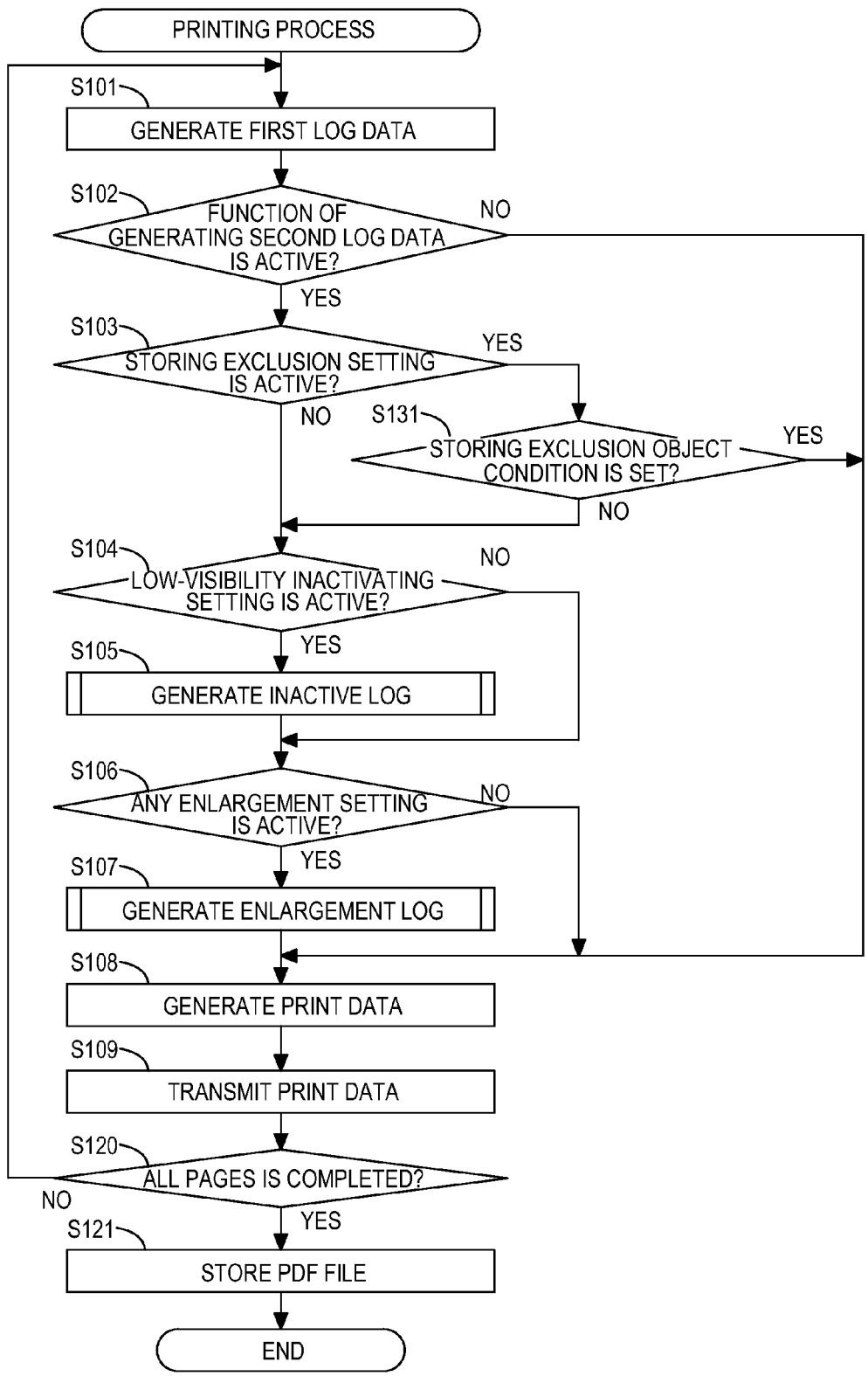
FIG. 4 is a flow chart showing a procedure of a printing process of a printer driver.

Subsequently, a printing process of the PC 1 for implementing the above-described printing procedure will be described with reference to the flow chart of FIG. 4. FIG. 4 shows the procedure of the printer driver 40 which the CPU 11 performs in response to reception of a print instruction from the application program 61 through the OS.

In the printing process, first, in Step S101, the CPU 11 generates first log data based on a printing condition, based on which the printing apparatus performing printing. Specifically, in Step S101, the CPU 11 receives a drawing command for one page from the graphic engine 51, and generates a BMP image of one page based on the received drawing command. The BMP image may be generated by the printer driver 40. Alternatively, if the graphic engine 51 has a function of generating a BMP image, the graphic engine 51 may generate the BMP image. Next, the CPU 11 performs thinning process on the generated BMP image, and converts the thinned BMP image into JPEG data. This JPEG data becomes the first log data. Herein, the thinning process is a process of reducing a data size, and an example of thinning process is a process of omitting data at intervals of one or more dots in a BMP image. The generated first log data is stored in a temporal folder. Incidentally, if the thinning process is performed, the visibility of content of printing would further deteriorate when displaying or printing the log data since some dots are omitted from the BMP image.

After Step S101, in Step S102, the CPU 11 determines whether the function of generating second log data is set active based on the log setting. When the function of generating second log data is set inactive ("NO" in Step S102), the CPU 11 proceeds to Step S108, without generating any second log data. Processes of Step S108 and the subsequent steps will be described below.

When the function of generating second log data is set active ("YES" in Step S102), in Step S103, the CPU 11 determines whether the storing exclusion setting is set active. When the storing exclusion setting is set active ("YES" in Step S103), in Step S131, the CPU 11 determines whether any storing exclusion object condition is set in the printing condition. A storing exclusion object condition is set in the log setting screen 411 by selection of the user. When a storing exclusion object condition is set in the printing condition ("YES" in Step S131), the CPU 11 proceeds to Step S108, without generating second log data.

When any storing exclusion object condition is set in the printing condition ("NO" in Step S131), or when the storing exclusion setting is set inactive ("NO" in Step S103), in Step S104, the CPU 11 determines whether the low-visibility inactivating setting is set active. When the low-visibility inactivating setting is set active ("YES" in Step S104), in Step S105, the CPU 11 performs an inactive log generating process of generating second log data.

Figure 5:
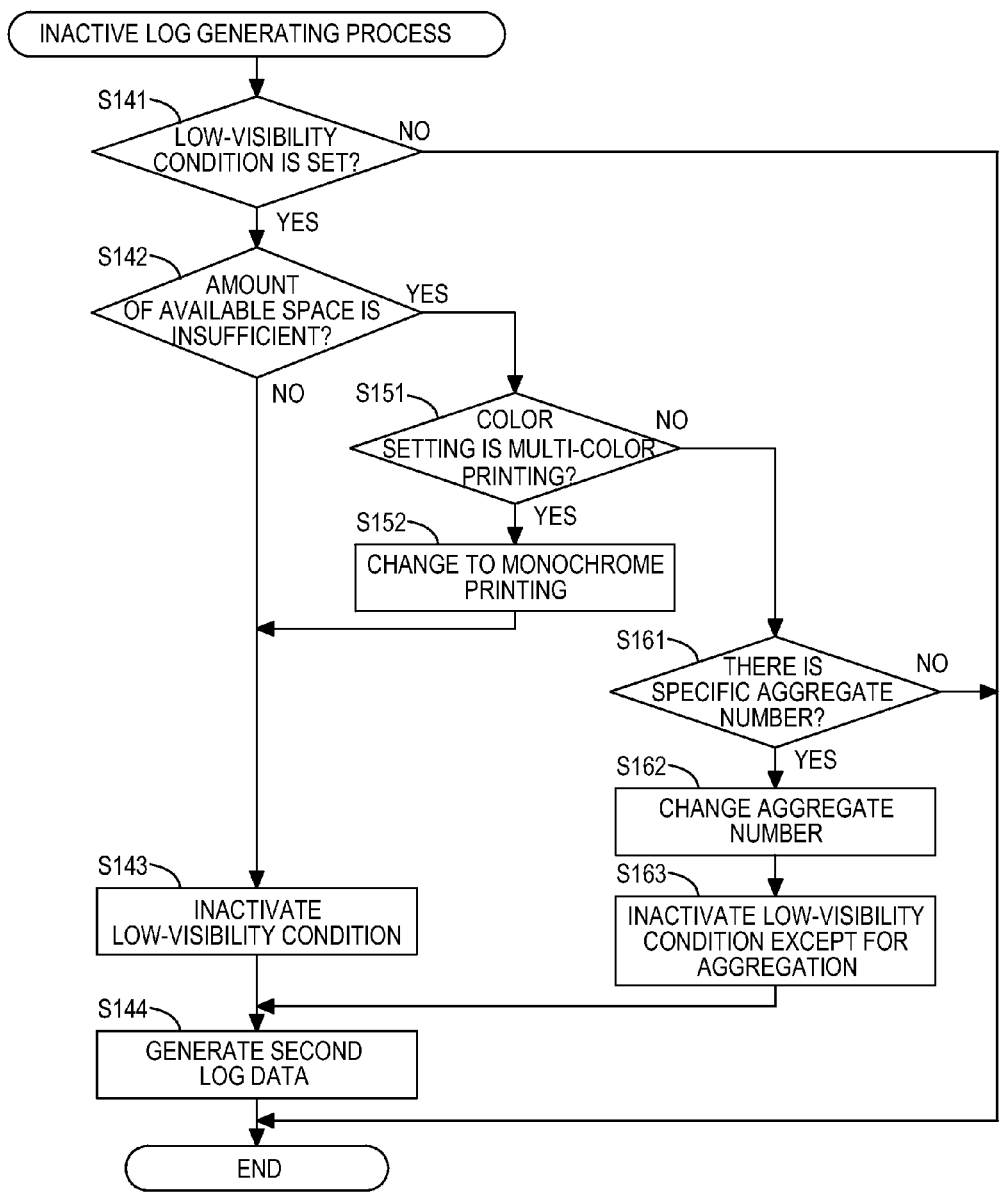
FIG. 5 is a flow chart showing a procedure of an inactive log generating process of the printer driver.

FIG. 5 shows the procedure of the inactive log generating process of Step S104. In the inactive log generating process, first, in Step S141, the CPU 11 determines whether any low-visibility condition selected in the log setting screen 411 is in the printing condition. When any low-visibility condition is not set in the printing condition ("NO" in Step S141), since there is no condition to be an inactive object, the CPU 11 finishes the inactive log generating process, without generating any second log data.

When a low-visibility condition is set in the printing condition ("YES" in Step S141), in Step S142, the CPU 11 determines whether the amount of available space of a log data storing area is insufficient. Specifically, in Step S143, when the amount of available space is less than a threshold value, the CPU 11 determines that the amount of available space is insufficient. The amount of available space of the log data storing area may be the amount of the whole available space of the HDD 14, or may be the amount of available space of a specific storage area of the HDD 14 reserved for storing log data.

When the amount of available space of the storing area is not insufficient ("NO" in Step S142), in Step S143, the CPU 11 defines a different printing condition in which the set low-visibility condition is inactivated. For example, when an aggregate printing such as a 2in1 printing or a 4in1 printing is designated, the CPU 11 cancels the aggregate printing, thereby changing into a 1in1 printing. Next, in Step S144, the CPU 11 generates second log data including an image according to the different printing condition in which the low-visibility condition is inactivated from the printing condition. That is, the CPU 11 generates log data including an image according to the different printing condition different from the printing condition. Also, even in Step S144, the CPU 11 performs thinning process in a similar manner to that during generating of the first log data. The generated second log data is stored in the temporal folder. After Step S144, the CPU 11 finishes the inactive log generating process.

Meanwhile, when the amount of available space of the storing area is insufficient ("YES" in Step S142), the CPU 11 defines a different printing condition such that the data amount of second log data is reduced. Specifically, in Step S151, the CPU 11 determines whether a color setting of the printing condition is a multi-color printing. Since changing of the color setting does not cause image reduction, density change, or the like, even if the content of the color setting is changed, visibility does not considerably change. Meanwhile, if the color setting is changed from the multi-color printing to a monochrome printing, the data amount of the log data would decrease. For this reason, when the color setting is the multi-color printing ("YES" in Step S151), in Step S152, the CPU 11 defines a different printing condition in which the color setting is changed from the multi-color printing to the monochrome printing.

After Step S152, the CPU 11 inactivates the low-visibility condition of the different printing condition in Step S143, and generates second log data including an image according to the changed condition in Step S144. That is, the CPU 11 generates log data including the image according to a different printing condition different from the printing condition. After Step S144, the CPU 11 finishes the inactive log generating process.

Also, when the color setting is the monochrome printing ("NO" in Step S151), in Step S161, the CPU 11 determines whether the aggregate printing is set in the printing condition and there is a specific aggregate number less than an aggregate number set as the number of pages per sheet set in the printing condition and larger than one. For example, when four is set as the number of pages per sheet in the printing condition (that is, the 4in1 printing is set), the CPU 11 changes the number of pages per sheet to two (that is, the CPU 11 performs changing to the 2in1 printing). In other words, if a particular number which is an even number greater than two is set as the number of pages per sheet, the CPU 11 changes the number of page per sheet into an even number less than the particular number. As a result, though the visibility becomes worse than that in a case of the 1in1 printing in which the aggregate printing is set inactive, the visibility is improved as compared to a case of the 4in1 printing of the printing condition. Further, in the 1in1 printing, four log data are generated, whereas in the 2in1 printing, only two log data need to be generated. Therefore, it is possible to reduce the data amount of log data as the whole print job. For this reason, when there is the specific aggregate number ("YES" in Step S161), in Step S162, the CPU 11 defines a different printing condition in which the number of pages per sheet is changed to the specific aggregate number.

After Step S162, the CPU 11 inactivates the low-visibility condition of the different printing condition, except for the aggregate printing, in Step S163, and generates second log data including an image according to the changed condition. That is, the CPU 11 generates log data including an image according to a different printing condition different from the printing condition. After Step S144, the CPU 11 finishes the inactive log generating process. Also, when there is not the specific aggregate number ("NO" in Step S161), in order to avoid a risk that the memory will be full, the CPU 11 finishes the inactive log generating process, without generating any second log data.

Referring to FIG. 4, after the inactive log generating process of Step S105, or when the low-visibility inactivating condition is set inactive ("NO" in Step S104), in Step S106, the CPU 11 determines whether there is any enlargement settings set active, that is, whether at least one of the sheet enlargement setting and the character enlargement setting is set active. When there is an enlargement setting set active ("YES" in Step S106), in Step S107, the CPU 11 performs an enlargement log generating process of generating second log data.

Figure 6:
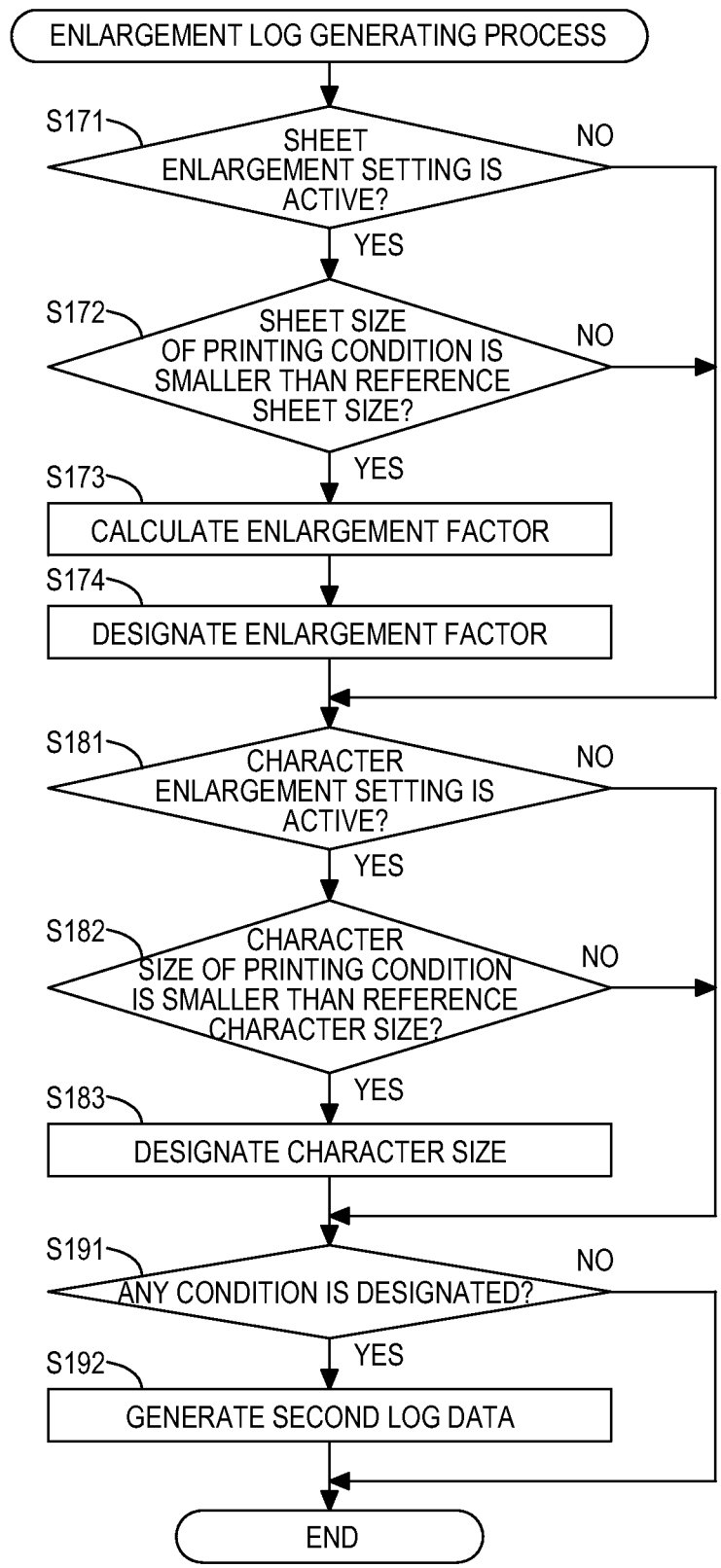
FIG. 6 is a flow chart showing a procedure of an enlargement log generating process of the printer driver.

FIG. 6 shows the procedure of the enlargement log generating process of Step S107. In the enlargement log generating process, first, in Step S171, the CPU 11 determines the sheet enlargement setting is set active.

When the sheet enlargement setting is set active ("YES" in Step S171), in Step S172, the CPU 11 determines whether a sheet size set in the printing condition is smaller than the reference sheet size. In the present illustrative embodiment, when at least one of a sheet size in a longitudinal direction and a sheet size in a transverse direction is smaller than that of the reference sheet size, the CPU 11 determines that the sheet size of the printing condition is smaller than the reference sheet size. The reference sheet size may be a variance value which can be set in advance in the log setting screen 411 by the user, or may be a fixed value.

When the sheet size of the printing condition is smaller than the reference sheet size ("YES" in Step S172), in Step S173, the CPU 11 calculates an enlargement factor for enlargement from the sheet size of the printing condition to the reference sheet size. Thereafter, in Step S174, the CPU 11 designates the calculated enlargement factor as a printing magnification.

After Step S174, or when the sheet size of the printing condition is not smaller than the reference sheet size ("NO" in Step S172), or when the sheet enlargement setting is set inactive ("NO" in Step S171), in Step S181, the CPU 11 determines whether the character enlargement setting is set active.

When the character enlargement setting is set active ("YES" in Step S181), in Step S182, the CPU 11 determines whether a character size set in the printing condition is smaller than the reference character size. The reference character size may be a variance value which can be set in advance in the log setting screen 411 by the user, or may be a fixed value. When the character size of the printing condition is smaller than the reference character size ("YES" in Step S182), in Step S183, the CPU 11 designates the reference character size as the character size.

After Step S183, or when the character enlargement setting is set inactive ("NO" in Step S181), or when the character size of the printing condition is not smaller than the reference character size ("NO" in Step S182), in Step S191, the CPU 11 determines whether there is any condition designated. When there is any condition designated ("YES" in Step S191), that is, when an enlargement factor is designated in Step S174, or a character size is designated in Step S183, or both of an enlargement factor and a character size are designated, in Step S192, the CPU 11 generates second log data including an image according to a different printing condition in which each condition of the printing condition is changed to the designated size. Even during generating of the second log data in Step S192, the CPU 11 performs the thinning process in a similar manner to that for the first log data. The generated second log data is stored in the temporal folder. After Step S192, the CPU 11 finishes the enlargement log generating process.

Meanwhile, when there is no condition designated ("NO" in Step S191), that is, when both of the sheet size and the character size are larger than the reference sizes, the CPU 11 finishes the enlargement log generating process, without generating any second log data.

Referring to FIG. 4, after the enlargement log generating process of Step S107, or when no enlargement setting is set active ("NO" in Step S106), or when the function of generating second log data is set inactive ("NO" in Step S102), or when any storing exclusion object condition is set in the print job ("YES" in Step S131), in Step S108, the CPU 11 generates print data based on the printing condition. Specifically, in Step S108, the CPU 11 copies the BMP image generated in Step S101, and converts the BMP image into data having a PDL format. This data having the PDL format becomes print data.

After Step S108, in Step S109, the CPU 11 transmits the print data generated in Step S108 to the printer 2. Incidentally, generating and transmitting of print data may be performed not only after generating of log data, but also before or with generating of log data.

After Step S109, in Step S120, the CPU 11 determines whether transmitting of print data of all pages is completed. If transmitting of print data of all pages is completed ("NO" in Step S120), the CPU 11 continues the processes of Step S101 and the subsequent steps with respect to unprocessed pages.

Meanwhile, when transmitting of print data of all pages is completed ("YES" in Step S120), in Step S121, the CPU 11 integrates log data of all pages stored in the temporal folder, for each printing condition, thereby generating PDF files, and stores the generated PDF files in the designated folder of the HDD 14. Specifically, in Step S121, the CPU 11 generates a maximum of three PDF files, that is, a PDF file for first log data based on the printing condition of Step S101, a PDF file for second log data according to the different printing condition of Step S144, and a PDF file for second log data according to the different printing condition of Step S192. After Step S121, the CPU 11 finishes the printing process.

As described above, when generating log data including images corresponding to print data, the printer driver 40 of the present illustrative embodiment generates not only a first log data including an image according to a printing condition, but also second log data including an image according to a different printing conditions different from the printing condition if necessary. Therefore, a possibility that a log data including an image with no or smaller deterioration in visibility will be generated increases, and it becomes easier to confirm the content of printing. Also, even when generating second log data, since the printer driver 40 generates an image according to the printing condition as first log data, it is possible to surely confirm the image of a printing material. For example, when the printing condition includes a low-visibility condition such as condition of reducing a number of dots or reducing a size of dots in an image, the printer driver 40 generates a first log data including an image according to the printing condition and a second log data including an image according to a different printing condition which is defined by the printing condition having the low-visibility condition inactive. In this case, since the second log data is generated according to the different printing condition having the low-visibility condition inactive, the number of dots or the size of dots in the image of the second log data is larger than those in the image of the first log data. If the size of dots in the image becomes larger, for example, a line in the image becomes thicker, which would be able to improve visibility of the content of printing. If the number of dots in the image becomes larger, in an assumption where a resolution is same, for example, a letter in the image becomes larger, which would be able to improve visibility of the content of printing.

While the present invention has been shown and described with reference to certain illustrative embodiments thereof, it will be understood by those skilled in the art that various changes in form and details may be made therein without departing from the spirit and scope of the invention as defined by the appended claims. For example, the printing apparatus is not limited to a printer, but may be a copy machine, a FAX, a multi-function apparatus having a printing function, or the like. Also, the information processing apparatus is not limited to a PC, but may be a workstation, a smart phone, a PDA, or the like.

Also, in the illustrative embodiment, the log data 41 are stored in the HDD 14 of the PC 1. However, the present invention is not limited thereto. For example, the log data 41 may be stored in an external storage such as a server connected through the network interface 18.

Also, in the illustrative embodiment, whenever print data 42 of one page is generated, the print data 42 is transmitted to the printer 2. However, the transmitting timing of print data 42 to the printer 2 is not limited thereto. For example, print data 42 may be transmitted in units of a predetermined number of pages, or may be transmitted after print data of all pages are generated, or may be transmitted if the memory becomes full.

Also, in the illustrative embodiment, generating of log data 41 is performed alternately with generating of print data 42, but may be performed collectively after transmitting of print data. For example, a BMP image of each page generated during generating of print data 42 may be stored in the temporal folder, and after generating of the print data 42, log data 41 may be generated based on BMP images stored in the temporal folder.

Also, in the illustrative embodiment, as low-visibility conditions, the toner saving printing and the aggregate printing. However, the low-visibility conditions are not limited thereto. That is, a low-visibility condition needs to be a condition for reducing the number of dots or a dot size in an image, and thus, for example, a size reduction or a low resolution may be included in low-visibility conditions selectable in the log setting screen 411.

Also, in the illustrative embodiment, as second log data, a maximum of two second log data, that is, second log data which is generated in the inactive log generating process, and second log data which is generated in the enlargement log generating process are generated. However, the number of second log data is not limited to two. For example, only any one of the inactive log generating process and the enlargement log generating process may be performed such that only one second log data is generated. Also, in the enlargement log generating process, second log data reflecting both of the sheet enlargement setting and the character enlargement setting is generated. However, second log data reflecting the sheet enlargement setting and the character enlargement setting, respectively, may be generated. That is, it is possible to generate a maximum of three second log data. Also, when any other condition is changed, second log data reflecting that change may be generated. In this case, it is possible to generate four or more second log data.

Also, in the illustrative embodiment, in the inactive log generating process, a different printing condition is determined according to the amount of available space. However, regardless of the amount of available space, second log data may be generated based on a different printing condition in which the low-visibility condition is set inactive. Also, even in a case of determining a different printing condition according to the amount of available space, only one of determination on the color setting and determination on the number of pages per sheet may be performed. Also, any other conditions may be added.

Also, in the illustrative embodiment, during generating of first log data and second log data, thinning process is performed on each image to be included, whereby log data having a small data size is generated. However, thinning process may not be performed.

Also, the processes disclosed in the illustrative embodiment may be performed by a single CPU, a plurality of CPUs, hardware such as an ASIC, or a combination of them. Further, the processes disclosed in the illustrative embodiment can be implemented in various forms such as a recording medium having programs for performing those processes, or methods of forming those processes.

What is claimed is:

1. A non-transitory computer-readable medium having a computer program stored thereon and readable by a computer of an information processing apparatus, the computer program, when executed by the computer, causing the information processing apparatus to perform:

acquiring a printing condition for print data to be printed by a printing apparatus;

generating the print data based on the printing condition;

outputting the generated print data to the printing apparatus;

determining, based on the printing condition, whether to generate a plurality of log data, each including an image corresponding to the print data;

generating first log data being according to the acquired printing condition;

if it is determined to generate the plurality of log data for the print data, storing in a storage device the first log data, and generating and storing in the storage device second log data being according to another printing condition different from the acquired printing condition; and if it is determined not to generate the plurality of log data for the print data, storing in the storage device only the first log data.

2. The non-transitory computer-readable medium according to claim 1, wherein the computer program further causes the information processing apparatus to perform:

in the case where the acquired printing condition includes a specific condition of reducing a number of dots or reducing a size of dots in an image, determining to generate the plurality of log data for the print data; and generating the second log data according to the another printing condition, the another printing condition being defined by the acquired printing condition having the specific condition inactive.

3. The non-transitory computer-readable medium according to claim 1, wherein the computer program further causes the information processing apparatus to perform:

in the case where the acquired printing condition includes a specific condition of reducing a number of dots or reducing a size of dots in an image, and an amount of available space of the storage device is not less than a particular value, determining to generate the plurality of log data for the print data, and generating the second log data according to the another printing condition, the another printing condition being defined by the acquired printing condition having the specific condition inactive.

4. The non-transitory computer-readable medium according to claim 2, wherein the computer program further causes the information processing apparatus to perform:

in the case where the acquired printing condition includes the specific condition, an amount of available space of the storage device is less than a particular value, and a color setting of the acquired printing condition is multi-color printing, determining to generate the plurality of log data for the print data; and generating the second log data according to the another printing condition, the another printing condition being defined by the acquired printing condition having the specific condition inactive and having the color setting set to a monochrome printing.

5. The non-transitory computer-readable medium according to claim 1, wherein the computer program further causes the information processing apparatus to perform:
in the case where the acquired printing condition has an aggregate printing setting active, and an amount of available space of the storage device is not less than a particular value,
determining to generate the plurality of log data for the print data, and
generating the second log data according to the another printing condition, the another printing condition being defined by the acquired printing condition having the aggregate printing setting inactive, and
in the case where the acquired printing condition has the aggregate printing setting active, the amount of available space of the storage device is less than the particular value, and an aggregate number of the aggregate printing setting is a particular number which is an even number greater than two,
determining to generate the plurality of log data for the print data, and
generating the second log data according to the another printing condition, the another printing condition being defined by the acquired printing condition having the aggregate number of the aggregate printing setting set to an even number less than the particular number.

6. The non-transitory computer-readable medium according to claim 2,
wherein the specific condition includes at least one of settings for reduction of an image size, an aggregate printing of printing a plurality of pages onto one sheet, change to low resolution, and change to low density.

7. The non-transitory computer-readable medium according to claim 1, wherein the computer program further causes the information processing apparatus to perform:
in the case where a sheet size smaller than a reference sheet size is set in the printing condition,
determining to generate the plurality of log data for the print data, and
generating the second log data according to the another printing condition, the another printing condition being defined by the acquired printing condition having an enlargement factor set to change a size of the image included in the log data to a reference image size corresponding to the reference sheet size.

8. The non-transitory computer-readable medium according to claim 1, wherein the computer program further causes the information processing apparatus to perform:
in the case where a character size smaller than a reference character size is set in the printing condition,
determining to generate the plurality of log data for the print data, and
generating the second log data according to the another printing condition, the another printing condition being defined by the acquired printing condition having the character size set to the reference character size.

9. The non-transitory computer-readable medium according to claim 1, wherein the computer program further causes the information processing apparatus to perform:
in the case where the printing condition has at least one of a secure printing setting and a watermark printing setting active, determining not to generate the plurality of log data for the print data.

10. The non-transitory computer-readable medium according to claim 1,
wherein the first log data and the second log data are generated by performing a thinning process.

11. An information processing apparatus comprising:
a communication unit configured to perform communication with another apparatus; and
a controller configured to:
acquire a printing condition for print data to be printed by a printing apparatus;
generate the print data based on the printing condition;
output the generated print data to the printing apparatus via the communication unit;
determine, based on the printing condition, whether to generate a plurality of log data, each including an image corresponding to the print data;
generate first log data being according to the acquired printing condition;
if it is determined to generate the plurality of log data for the print data, store in a storage device the first log data and generate and store in the storage device second log data being according to another printing condition different from the acquired printing condition; and
if it is determined not to generate the plurality of log data for the print data, store in the storage device only the first log data.

* * * * *